United States Patent
Odake et al.

(10) Patent No.: US 6,832,954 B2
(45) Date of Patent: Dec. 21, 2004

(54) PHOTOGRAPHING GAME MACHINE, PHOTOGRAPHING GAME PROCESSING METHOD AND INFORMATION STORAGE MEDIUM

(75) Inventors: Shinichi Odake, Tokyo (JP); Yoshihiko Kaneko, Tokyo (JP); Yasuhiro Wakatsuki, Tokyo (JP)

(73) Assignee: NAMCO Ltd., Tokyo (JP)

( * ) Notice: Subject to any disclaimer, the term of this patent is extended or adjusted under 35 U.S.C. 154(b) by 0 days.

(21) Appl. No.: 09/863,062

(22) Filed: May 21, 2001

(65) Prior Publication Data

US 2002/0004419 A1 Jan. 10, 2002

(30) Foreign Application Priority Data

May 30, 2000 (JP) ........................................ 2000-160424
May 30, 2000 (JP) ........................................ 2000-160425

(51) Int. Cl.⁷ ................................................. A63F 9/24
(52) U.S. Cl. ................................ 463/7; 463/37; 463/36
(58) Field of Search ............................... 463/7, 48, 51, 463/53, 36, 37

(56) References Cited

U.S. PATENT DOCUMENTS

| | | | | |
|---|---|---|---|---|
| 3,838,856 A | * | 10/1974 | Takeya et al. ............... | 345/156 |
| 4,257,612 A | * | 3/1981 | Villa ............................. | 463/5 |
| 4,322,726 A | | 3/1982 | Collier et al. | |
| 4,602,790 A | * | 7/1986 | Furukawa ..................... | 463/53 |
| 4,844,476 A | * | 7/1989 | Becker .......................... | 463/5 |
| 5,213,335 A | * | 5/1993 | Dote et al. .................... | 434/21 |
| 5,569,085 A | * | 10/1996 | Igarashi et al. ............... | 434/18 |
| 5,795,224 A | * | 8/1998 | Yoshida ......................... | 463/2 |
| 6,120,379 A | * | 9/2000 | Tanaka et al. ................. | 273/148 B |
| 6,285,381 B1 | * | 9/2001 | Sawano et al. ................ | 345/582 |
| 6,312,337 B1 | * | 11/2001 | Edwards et al. .............. | 273/429 |
| 6,379,249 B1 | * | 4/2002 | Satsukawa et al. ............ | 434/22 |
| 6,589,120 B1 | * | 7/2003 | Takahashi ..................... | 463/51 |

FOREIGN PATENT DOCUMENTS

| | | |
|---|---|---|
| JP | 50-72515 | 6/1975 |
| JP | 1-112323 | 5/1989 |
| JP | 3-77976 | 8/1991 |
| JP | 7-181934 | 7/1995 |
| JP | 8-21976 | 1/1996 |
| JP | 3067486 | 1/2000 |
| JP | 2000-90107 | 3/2000 |
| JP | 2000-070548 | 3/2000 |
| JP | 2000-102671 | 4/2000 |
| JP | 2000-116946 | 4/2000 |
| JP | 2000-262751 | * 9/2000 |

OTHER PUBLICATIONS

Extract from "Weekly Fami–Tsu (Feb. 25, 2000)", Enter Brain Corp., Feb. 25, 2000, vol. 15, No. 8, pp. 24–25.
Extract from "Monthly Game Walker (Apr. 1, 1999)", Kadokawa Shoten Corp., Apr. 1, 1999, vol. 6, No. 4, p. 115.

\* cited by examiner

Primary Examiner—Jessica Harrison
Assistant Examiner—Corbett B Coburn
(74) Attorney, Agent, or Firm—Dellett & Walters

(57) ABSTRACT

A photographing game machine in which a camera-type input device allowing a subject included in a photo shooting range to be seen through a window is used, and when a game screen including a target to be photographed is displayed, game operations are performed based on a position on the game screen at which this camera-type input device is pointed, a photographing game processing method and an information storage medium are disclosed.

13 Claims, 10 Drawing Sheets

PHOTOGRAPHING GAME MACHINE, PHOTOGRAPHING GAME PROCESSING METHOD AND INFORMATION STORAGE MEDIUM

BACKGROUND OF THE INVENTION

1. Field of the Invention

The present invention relates to a photographing game machine for playing games using camera-type input devices, a photographing game processing method and an information storage medium.

For current game machines installed in game arcades or the like, dedicated input devices having different structures depending on types of game machines and so on are often used. For car race games, for example, a handle, an accelerator, a brake or the like are provided, and an input device imitating a real car is used. Also, for shooting games, a barrel, a trigger or the like are provided, and an input device imitating a real gun is used. In this way, by using dedicated input devices with game contents taken into considerations, true-to-life game machines can be achieved.

2. Description of the Prior Art

For conventional game machines using various kinds of input devices as described above, the more unique the shape and use of the input device, the more strongly a player is impressed by the feature of the input device itself. Therefore, if considering a new type of game machine, some changes made to game contents without changing input devices will result in a lack of freshness as an impression given to the player. In other words, if same input devices are always used, it may be difficult to give a fresh impression to the player.

Against this backdrop, a new game machine using a camera as a new input device is being considered. For example, a "photographing game machine" using a camera controller is disclosed in Japanese Patent Laid-open No. 2000-70548. This camera controller has a structure almost same as that of a digital camera, and by using this camera controller to photograph a game screen on a projector, a predetermined photographing game is played. This photographing game machine is provided with a photographing judgment section that makes a negative judgment against the result of photographing with a focus deviation, an angle deviation, unsteadiness or the like as subjects for demerit marks.

By the way, the photographing game machine disclosed in the above described specification has a disadvantage that processing is complicated because the camera controller having a structure almost same as that of the digital camera is used to actually take a photograph of a part of the game screen displayed by the projector, and a judgment is made as to the result of the photographing to carry out scoring processing and processing for continuation of the game. Particularly, with respect to judgment of the result of the photographing, it is described that a negative judgment is made with a focus deviation, an angle deviation, unsteadiness or the like as subjects for demerit marks, and a positive judgment is made when a photograph of specified scene can be taken and, for example, a photograph can be taken at the moment when the best smile is flashed in addition to factors such as composition in the case of a woman model, but when such a judgment is made by using actually photographed images, methods such as high-level pattern matching or the like should be used, resulting in compilation of processing. Furthermore, considering that the above described judgment processing is carried out each time the contents of the game screen are renewed (for example, every one sixtieth of a second), a CPU capable of performing extremely quick operation should be used, thus causing an increase in cost.

Also, the photographing game machine disclosed in the above described specification has a disadvantage that the image quality of photographed images is poor because the camera controller having a structure almost same as that of the digital camera is used to actually take a photograph of a part of the game screen displayed by the projector. Generally, if the game screen displayed by the projector or the like is photographed by using a camera, resolution reduced at the time of display is further reduced, thus making it impossible to obtain a clear photographed image. Furthermore, since it can also be considered that foreign light is let in a part of the game screen in some locations where photographing game machines are installed and under some illuminator placement conditions, the image quality of photographed images may further be reduced.

SUMMARY OF THE INVENTION

Object of the Invention

The present invention has been created in the light of these points, and its object is to provide a photographing game machine in which a processing load can be relieved, a photographing game processing method and an information storage medium.

Also, another object of the present invention is to provide a photographing game machine in which the image quality of images obtained as a result of photographing can be improved, a photographing game processing method and an information storage medium.

Summary of the Invention

The photographing game machine of the present invention comprises a camera-type input device, a display device and a game operation section. A player can see a subject for photography included in a photo shooting range through the window of the camera-type input device. The display device displays a predetermined game screen including a target to be photographed. The game operation section performs predetermined game operations based on the position on the game screen, at which the camera-type input device is pointed. In this way, if the camera-type input device is used to perform an action to take a photograph of the game screen, the game progresses with detection of a position on the game screen corresponding to the photo shooting position, thus making it possible to relieve a processing load significantly, compared to the case where a judgment is made as to the contents of actually photographed images. Also, it is not necessary to provide the camera-type input device with an image pickup device such as a CCD (charge coupled device memory), thus making it possible to reduce costs.

Also, it is desirable that the above described game operation section comprises a photographed image extraction section extracting as an imitational photographed image an image on the game screen included in a predetermined range centering around the position on the game screen, at which the camera-type input device is pointed. Since a part of an image generated for displaying the game screen is extracted as a photographed image by the photographed image extraction section, there is no reduction in image quality compared to the photographed image obtained by actually taking a photograph, and the image quality when this photographed image is displayed and printed can be improved. Also, since a part of the image generated for displaying the game screen is used, it is not necessary to perform complicated processing for extracting the photographed image.

Also, it is desirable that the above described camera-type input device has a shutter switch through which the player provides instructions to take a photograph, and comprises a photo shooting position detection mechanism detecting as a photo shooting position an optional position on the game screen, at which the camera-type input device is pointed, when this shutter switch is operated. The optional position on the game screen is detected as a photo shooting position when the shutter switch is operated, thus making it possible to ensure operability similar to that of an actual camera.

Also, it is desirable that the above described game operation section comprises image generating unit for generating image data of the game screen that is displayed on the display device, photographing judgment unit for making a judgment of whether or not a predetermined task assigned to the player could be achieved, by comparing the display position of the target included in the game screen with the photo shooting position detected by the photo shooting position detection mechanism. By providing these configurations, a judgment can be made as to success or failure in achievement of the task based on the photo shooting position, instead of conduct to make a judgment of the result of photographing, thus making it possible to relieve a load of processing required for making a judgment as to success or failure in achievement of the task.

Also, it is desirable that a display device having a scan type display screen is used, and the photo shooting position detection mechanism comprises light receiving unit for detecting directive incident light, which is placed in the camera-type input device, screen lighting unit for making the screen of the display device emit light when the shutter switch is operated, and position detecting unit for detecting a photo shooting position based on the timing of detecting light by the light receiving unit placed in the camera-type input device, when the screen of the display device is made to emit light with this screen lighting unit. In the case where the scan type display device is used, if light is emitted on the whole display screen, the timing of emitting light in an optional position is actually measured, whereby the coordinate of the optional position can be known. By using this operational principle, the photo shooting position when the camera-type input device is used can be located easily and accurately.

Also, it is desirable that the above described position detection mechanism comprises a light emitting section emitting predetermined directive light to the screen of the display device, which is placed in the camera-type input device, a screen constituted by a translucent member placed between the camera-type input device and the screen of the display device, photographing unit for taking a photograph of the screen, and position detecting unit for detecting a photo shooting position by detecting a position on the above described screen reached by the light emitted from the light emitting section towards the screen of the display device, based on the result of photographing by the photographing unit. The photo shooting position when the camera-type input device is used can also be located easily and accurately by using the photo shooting position detection mechanism like this. Also, since it is not necessary to make the display screen of the display device emit light for detecting the photo shooting position, any limiting condition for displaying the game screen decreases, thus making it possible to simplify timing control for detection of the photo shooting position.

Also, the photographing game machine of the present invention has a configuration including the input device, the display device, the photo shooting position detection mechanism and the photographed image extracting unit. The player can see a subject included in a photo shooting range through the window of the input device. The display device displays a predetermined game screen including a target to be photographed. The photo shooting position detection mechanism detects as a photo shooting position an optional position on the game screen, at which the input device is pointed, by making the display screen of the display device emit light. The photographed image extracting unit cuts off image data included in the predetermined photo shooting range including the photo shooting position out of image data corresponding to a non-light-emission screen displayed in timing before or after timing of emitting light, when the display screen of the display device is made to emit light to detect the photo shooting position. In this way, for extracting the photographed image photographed by means of the input device, the non-light-emission screen is used that is displayed before or after the light emitting screen in place of the screen that is made to emit light for detection of the photo shooting position. Therefore, the photographed image can reliably be cut off. Particularly, since the image data corresponding to the display screen is used as a photographed image instead of an actually photographed image, there is no reduction in image quality, thus making it possible to ensure favorable image quality.

It is desirable that the above described input device has a shutter switch through which the player provides instructions to take a photograph, and when this shutter switch is operated, processing of detecting the photo shooting position by the photo shooting position detection mechanism and processing of cutting off image data by the photographed image extracting unit are performed. Thereby, operability as in the case of operating the shutter switch of the normal camera to take a photograph can be ensured.

Also, it is desirable that the above described input device is operated by the player with the distance from the display screen of the display device being almost fixed, and a certain area centering on the photo shooting position is defined as a photo shooting range defined by the photographed image extracting unit. If the distance between the display device and the input device is changed, the photo shooting range seen when looking into the window is also changed, and therefore the size of the photo shooting range must be changed in accordance with this distance. On the other hand, by keeping this distance almost fixed, the size of the photo shooting range defined by the photographed image extracting unit can be fixed, thus making it possible to simplify processing of cutting off images and so on.

Also, it is desirable that the above described photo shooting position detection mechanism has the screen lighting unit for making the screen of the display device emit light when the shutter switch is operated, and when two consecutive screens become light emitting objects at the time of making the screen of the display device emit light with this screen lighting unit, timing of emitting light by the screen that becomes a light emitting object later is delayed by at least one screen and a game screen is inserted between the two light emitting screens. If two consecutive images become light emitting objects, a situation in which the image is cut off from the light emitting screen occurs, but such an unfavorable situation can be prevented by inserting compulsorily a game screen between the two light emitting screens.

Particularly, in the case where a plurality of input devices are provided, there may be cases where shutter switches provided for these input devices are operated almost at the same time, and two screens become light emitting objects consecutively, but even in such cases, the photographed image can be reliably cut off because a game screens is inserted between the two screens.

Also, a photographing game processing method of the present invention comprises a first step of detecting a position on the game screen, at which the camera-type input device is pointed, by making the display screen of the display device emit light, a second step of making a judgment of relative positional relation between the position on the game screen detected in the first step and a predetermined target included in the game screen, a third step of making a judgment of success or failure in achievement of a task based on the result of the judgment by the second step, and a fourth step of cutting off image data included in a predetermined photo shooting range including the photo shooting position out of image data of a non-light-emission screen displayed in timing before or after timing of emitting light, when the photo shooting position is detected in the first step.

Also, an information storage medium of the present invention includes a program for detecting a position on the game screen at which the camera-type input device is pointed and carrying out different game processing depending on the relative positional relation between this detected position and a predetermined target on the game screen. Also, the information storage medium of the present invention includes a program for detecting as a photo shooting position an optional position on the game screen, at which the input device is pointed, by making the display screen of the display device emit light, and cutting off image data included in a predetermined photo shooting range including the photo shooting position out of image data of a non-light-emission screen displayed in timing before or after timing of emitting light.

By carrying out the photographing game processing method of the present invention, or executing the program stored in the information storage medium of the present invention, when the camera-type input device is used to perform an action to take a photograph of the game screen, the game progresses with detection of a position on the game screen corresponding to the photo shooting position, thus making it possible to relieve a processing load significantly compared to the case where a judgment is made as to the contents of the actually photographed image. Also, since not the screen that is made to emit light for detection of the photo shooting position but the non-light-emission screen that is displayed before or after the light emitting screen is used when the image photographed using the input device is cut off, the photographed image can reliably be cut off. Particularly, since the image data corresponding to the display screen is used as a photographed image instead of an actually photographed image, there is no reduction in image quality, thus making it possible to ensure favorable image quality.

DESCRIPTION OF THE PREFERRED EMBODIMENTS

Figure 1:
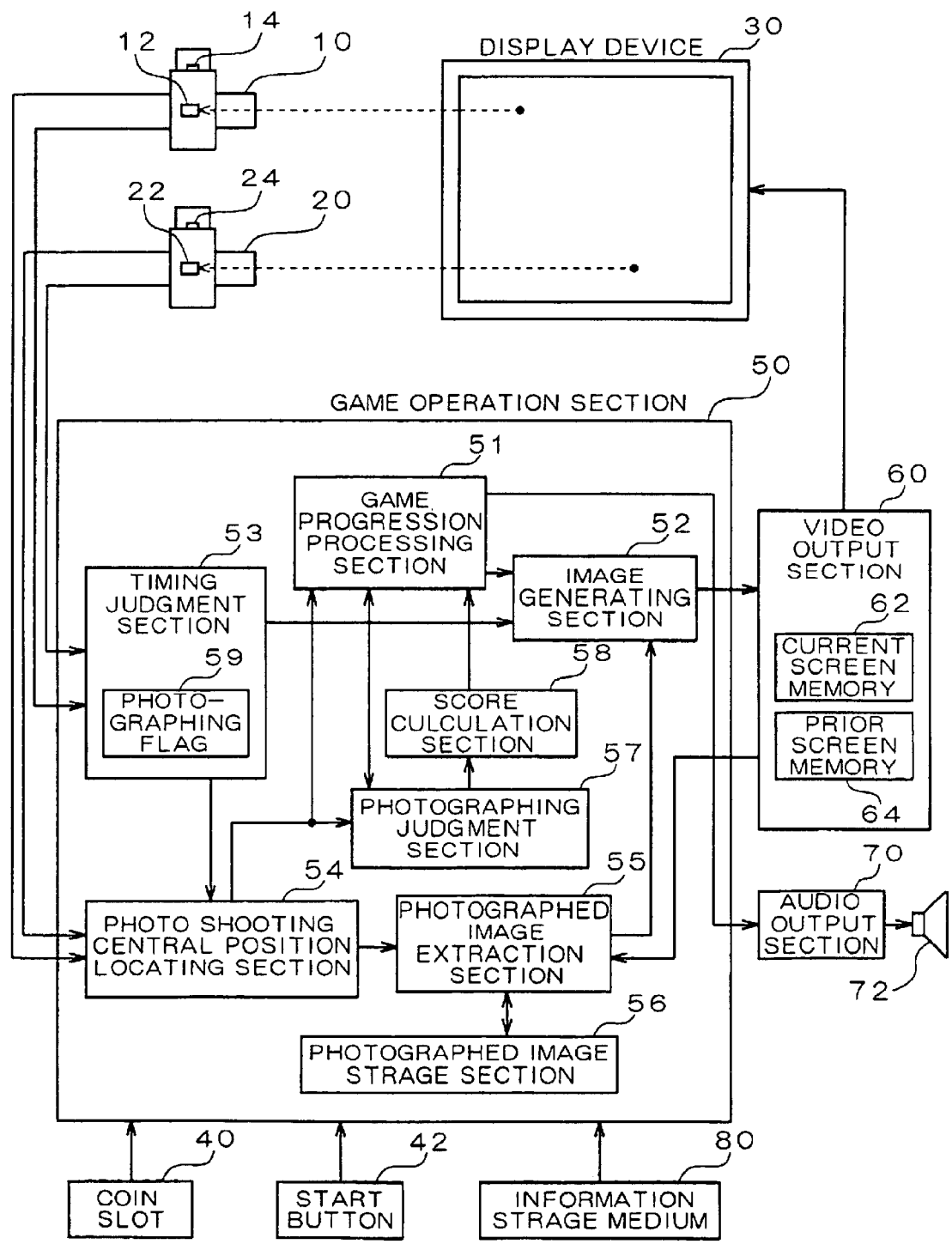
FIG. 1 shows a configuration of a photographing game machine of an embodiment.

A photographing game machine of an embodiment to which the present invention is applied will be described below, referring to the drawings.

Figure 2:
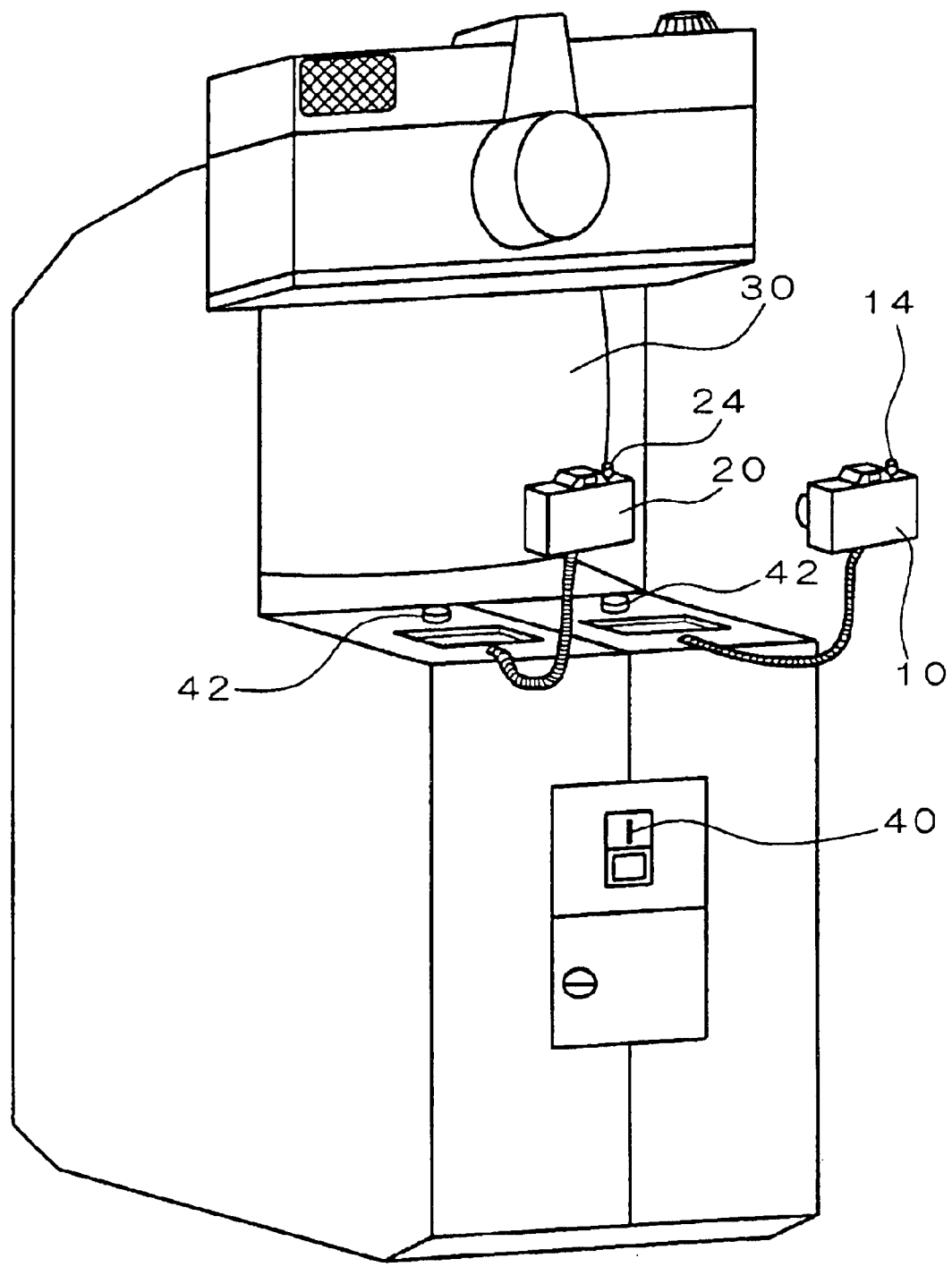
FIG. 2 is an external perspective view of the photographing game machine of this embodiment.

FIG. 1 shows a configuration of the photographing game machine of this embodiment. Also, FIG. 2 is an external perspective view of the photographing game machine of this embodiment. In this embodiment, for example, the photographing game machine for business purpose installed in a game arcade or the like will be described.

As shown in FIGS. 1 and 2, the photographing game machine of this embodiment comprises two camera-type input devices, 10, 20, a display device 30, a coin slot 40, a start button 42, a game operation section 50, a video output section 60, an audio output section 70, a speaker 72 and an information storage medium 80.

The camera-type input device 10 is a dedicated controller imitating the structure of a camera, and is provided with operability similar to that of a generally used digital camera and a camera loaded with a roll of photographic film.

Figure 3:
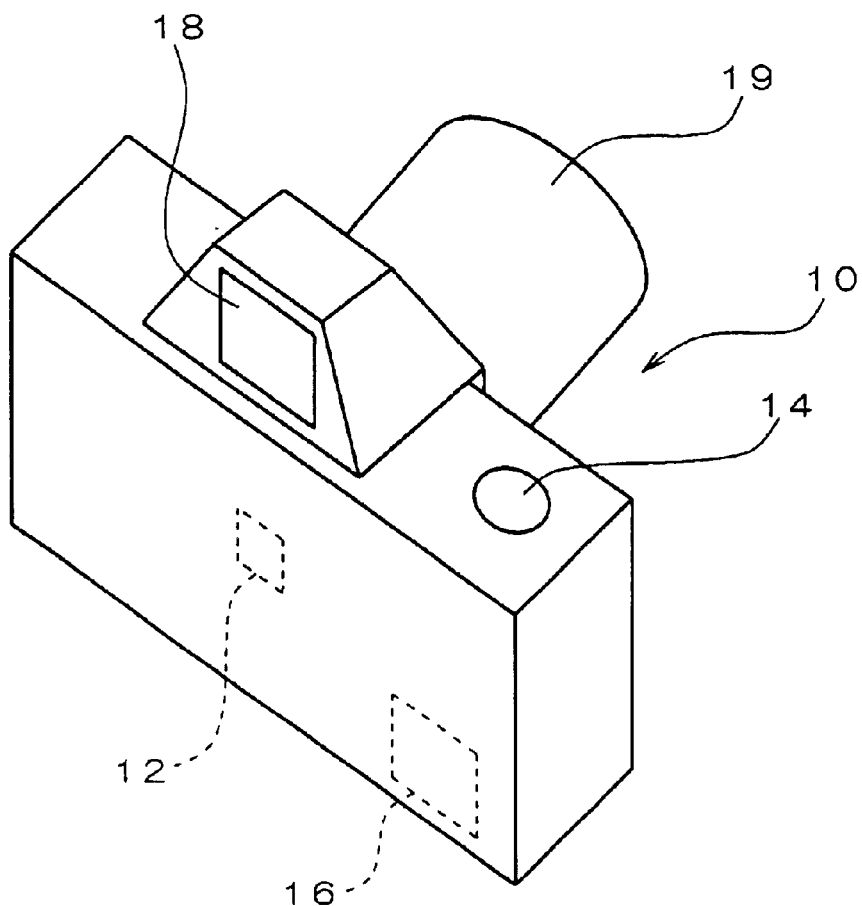
FIG. 3 is an external perspective view of a camera-type input device.

FIG. 3 is an external perspective view of the camera-type input device 10. The camera-type input device 10 shown in FIG. 3 comprises a light receiving section 12, shutter switch 14 and a coordinate detection section 16. Also, as shown in FIG. 3, the camera-type input device 10 comprises a window 18, and has a single-lens reflex structure allowing a player to see a subject included in a photo shooting range through a lens system 19 by looking into this window 18. The player can send to the game operation section 50 instructions to virtually take a photograph of an image in the photo shooting range seen visually through this window 18, by pressing down the shutter switch 14.

Figure 4:
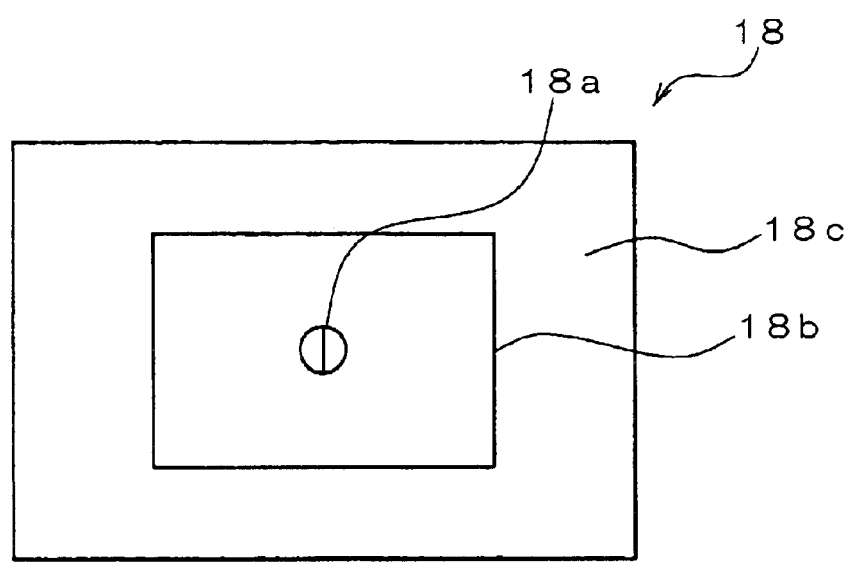
FIG. 4 shows an internal structure of a window.

FIG. 4 shows a screen configuration inside the window 18. As shown in FIG. 4, a central marker 18a indicating the central position of the photo shooting range, a photo shooting range frame 18b indicating the photo shooting range, and an out-of-bounds area 18c that is included in a visual field and corresponds to an area outside the photo shooting range frame 18b are included inside the window 18. The photo shooting range frame 18b represents a range within which it is possible to take a photograph, and the out-of-bounds area 18c outside this photo shooting range frame 18b is used for supporting player's operations. That is, by providing the out-of-bounds area 18c, when a moving subject is to enter the photo shooting range frame 18b, the movement of this subject can be perceived before the subject enters the photo shooting range 18b, thus enabling the player to shift the position of the central marker 18a to the position of the subject quickly while looking into the window 18.

When the shutter switch 14 is pressed down by the player, the coordinate detection section 16 detects an optional position on the screen of the display device 30, at which the lens system 19 of the camera-type input device 10 is pointed. From the camera-type input device 10, a photographing signal is outputted when the shutter switch 14 is pressed down, and a coordinate detection signal including the coordinate data of this optional position is outputted when the optional position on the screen is detected by the coordinate detection section 16. Furthermore, the camera-type input device 20 has a similar structure, and comprises a light receiving section 22 and a shutter switch 24.

The display device 30 displays a game image on the screen based on a video signal that is inputted. The display device 30 has a raster scan type structure and is constituted by, for example, a CRT (cathode-ray tube).

Because the display device 30 of the raster scan type performs display by predetermined scanning, time periods over which pixels in the optional position at which the camera-type input device 10 is pointed are made to emit light are different for the lateral coordinate and the vertical coordinate of this optional position even if the whole screen is made to emit light at a time (display operations of making the whole screen to emit light are referred to as "flash display" and the screen generated by the flash display is referred to as a "flash screen"). Thus, by measuring the time until the above described pixels in the optional position are made to emit light after the shutter switch 14 is operated to start the flash display of the screen after the camera-type input device 10 is pointed at the optional position of the display device 30, the coordinate of the optional position in the display screen at which camera-type input device 10 is pointed can be known.

Furthermore, since detection of the photo shooting central position is carried out using the camera-type input device 10 when a game screen is displayed on the screen of the display device 30, settings are made so that the light amount when the flash display is performed is greater than or equal to the light amount of the normal game image, thus preventing a situation in which operations to detect the optional position on the screen are erroneously carried out in response to the normal game image.

The coin slot 40 is a section into which the player puts coins. Also, the start button 42 is used by the player to give instructions to start a game.

The game operation section 50 controls the entire photographing game machine, and executes a predetermined game program, thereby starting operation processing for the photographing game using the camera-type input devices 10, 20 when the player puts the coin into the coin slot 40 and presses down the start button 42. Also, the game operation section 50 makes a judgment of whether or not the game is over. For example, the game operation section 50 measures time that has elapsed since the game operation was started, and determines that the game is over when predetermined time has elapsed since the game was started. In the case where the game is over, the game operation section 50 ends a series of operation processing for the photographing game.

The video output section 60 comprises a current screen memory 62 corresponding to the display screen and a prior screen memory 64 storing therein the contents of an immediately preceding display screen. The video output section 60 displays a predetermined game image on the screen of the display device 30 by reading out in scan order the image data generated by the game operation section 50 and stored in the current screen memory 62 and converting the same into predetermined signals (RGB signals and NTSC signals). Also, when screen display using the image data stored in the current screen memory 62 is ended, the image data stored in this current screen memory 62 is stored in the prior screen memory 64.

The audio output section 70 converts various kinds of audio data outputted from the game operation section 50 into audio signals, and outputs the same from the speaker 72.

The information storage medium 80 stores therein principally a program that is executed in the game operation section 50, image data and audio data or the like, for the task of each mini game. For example, semiconductor memories, hard disks or the like are used. Alternatively, it is possible to use a DVD and a CD as an information storage medium and input in the game operation section 50 a program or the like read by these read devices.

Also, the game operation section 50 shown in FIG. 1 comprises a game progression processing section 51, an image generating section 52, a timing judgment section 53, a photo shooting central position locating section 54, a photographed image extraction section 55, a photographed image storage section 56 and a photographing judgment section 57 and a score calculation section 58.

The game progression processing section 51 performs game operation required for allowing the photographing game of this embodiment to progress. For example, in this embodiment, a plurality of mini games different in contents from one another is prepared, and when any one of them is selected by the player, instructions to generate task images (images for task) to be corresponding to the selected mini game are sent from the game progression processing section 51 to the image generating section 52.

The image generating section 52 generates task image data prepared for each mini game, and generates image data for displaying a score of each player and photographed image data for displaying on a part of the screen the result of taking a photograph of a part of the display screen by each player. These image data are stored in the current screen memory 62 at the time when the screen is in an off-display state.

The timing judgment section 53 makes a judgment of photo shooting timing of having the screen flash-displayed to perform predetermined photographing processing complying with photographing instructions given by the player, in accordance with photographing signals inputted from the respective camera-type input devices 10, 20. As described above, the camera-type input devices 10, 20 detect respective photo shooting positions by having the entire screen of the display device 30 flash-displayed, but in this embodiment, the photographed image is captured using a screen displayed in timing immediately prior to this flash-displayed screen. Thus, when photographing signals are outputted from the camera-type input devices 10, 20, the next screen is flash-displayed in accordance with the photographing signal if the display screen under scanning is not a flash-displayed screen at this time, and processing of delaying operations to have the next screen flash-displayed by one screen is performed if on the contrary, the display screen under scanning at this time is a flash-displayed screen. In this way, by preventing a situation in which two consecutive screens are flash-displayed screens, namely by inserting compulsorily game screens between the two flash screens, processing of cutting off the photographed image can be performed irrespective of timing of the photographing signal being inputted.

Furthermore, for performing the above described timing judgment, the timing judgment section 53 has a photographing flag 59, and operations using this photographing flag 59 will be described in detail later.

The photo shooting central position locating section 54 locates photo shooting central positions based on coordinate data included in coordinate detection signals outputted from the camera-type input devices 10, 20. Basically, the coordinate of the photo shooting central position is detected by the coordinate detection section 16 in the camera-type input device 10 (or 20), and the coordinate data included in the coordinate detection signal is generated, thus making it possible to specify the photo shooting central position by using this coordinate data, but processing of making correction of the photo shooting central position coordinate is performed when the photographing game machine is manufactured or installed or the like, and an offset value is defined for each of lateral and vertical directions. Thus, the photo shooting central position locating section 54 locates the photo shooting central position after correction processing is performed, by adding this offset value to the coordinate data (lateral position data and vertical position data) included in the coordinate detection signal inputted from each of the camera-type input devices 10, 20.

The photographing image extraction section 55 defines as a photo shooting range a predetermined range around the photo shooting central position located by the photo shooting central position locating section 54, and performs processing of cutting off images on the display screen included in this photo shooting range. This photo shooting range within which images are cut off is defined so that it is almost identical to the photo shooting range 18b defined inside the window 18 of the camera-type input devices 10, 20. Also, in the photographing game machine of this embodiment, the image photographed by operating the camera-type input devices 10, 20 is displayed using a partial area of the screen on which the task image is displayed. Thus, the photographed image extraction section 55 outputs the photographing image data extract to the image generating section 52.

The photographed image storage section 56 stores therein image data corresponding to the photographed image cut off by the photographed image extraction section 55. For example, assuming that immediate three photographed images are displayed using a part of the screen for each of the camera-type input devices 10, 20, the photographed image storage section 56 has a storage domain corresponding to six photographed images in total, and a latest image is overwritten in turn.

The photographing judgment section 57 makes a judgment of whether or not a given task could be achieved for each selected mini game in terms of the result of player's operating the camera-type input devices 10, 20 to take a photograph. For example, if a specific target is displayed in a specific position in a moment, and if a task of taking a photograph of this target as a subject only once is given to each player, the photographing judgment section 57 makes a judgment of whether or not the timing the player's pressing down the shutter switch 14 of the camera-type input devices 10, 20 to give instructions to take a photograph matches the timing of displaying the above described target, and this target is included in the photo shooting range. If the task could be achieved and positive judgment results are obtained for both cases, it is judged that correct performance is made. On the other hand, when negative judgment results are obtained for at least one of the cases, it is considered that the task could not be achieved.

The score calculation section 58 performs predetermined score calculation in accordance with the result of judgment by the photographing judgment section 57. As for methods of calculating scores, there may be several patterns corresponding to the contents of photographing games. Specific examples of the contents of photographing games and calculation of scores will be described later.

The light receiving sections and coordinate detection sections of the above described camera-type input devices 10, 20, the photo shooting central position locating section 54, the timing judgment section 53, the image generating section 52 and the video output section 60 correspond to the photo shooting position detection mechanism. Also, the photographing judgment section 57 corresponds to the photographing judgment unit, the light receiving sections 12, 22 correspond to the light receiving unit, the timing judgment section 53, the image generating section 52 and the video output section 60 correspond to the screen lighting unit, and the coordinate detection sections in the camera-type input devices 10, 20 and the photo shooting central position locating section 54 correspond to the position detecting unit. Also, the photographed image extraction section 55 corresponds to the photographed image extracting unit.

The photographing game machine of this embodiment has such a configuration, and operations thereof will now be described.

Figure 5:
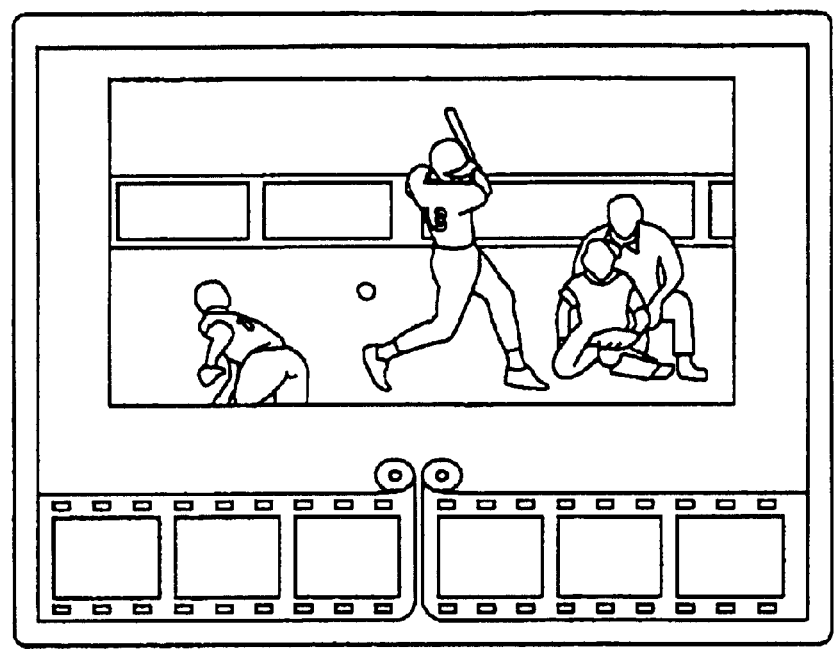
FIG. 5 shows a specific example of a mini game.
Figure 6:
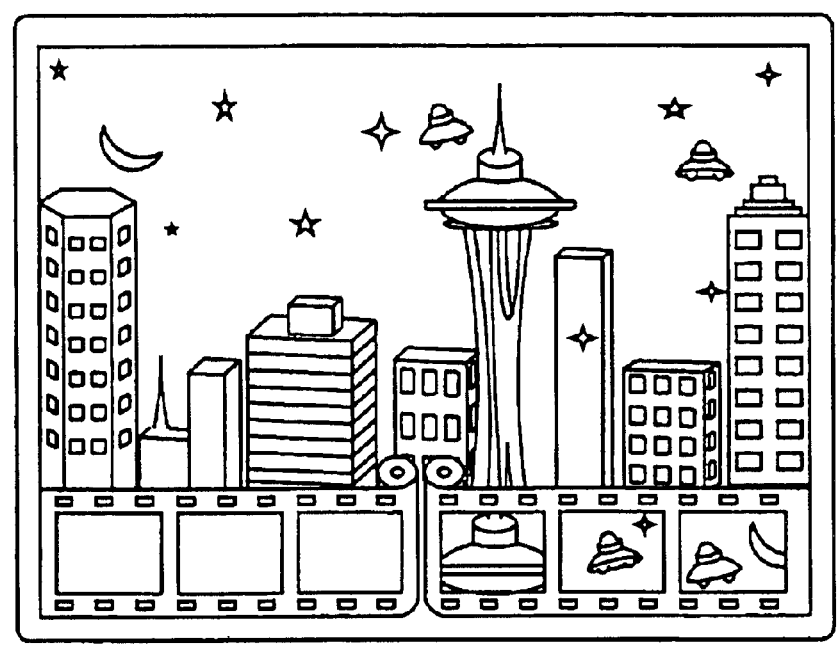
FIG. 6 shows a specific example of another mini game.
Figure 7:
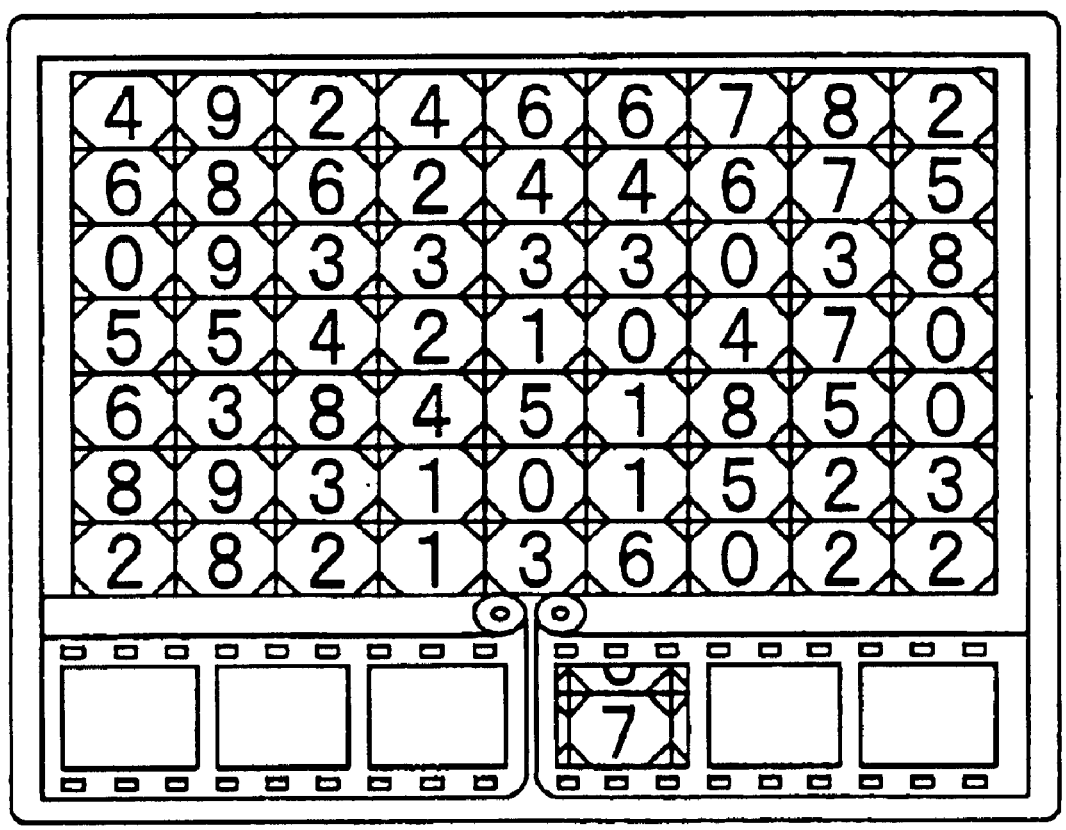
FIG. 7 shows a specific example of another mini game.

FIGS. 5 to 7 show specific examples of mini games selectable in the photographing game machine of this embodiment. In the mini game shown in FIG. 5, one scene of a baseball game represents a task image, and a positive judgment is made in the case of taking a photograph of the scene at the moment when a batter strikes back a ball thrown by a pitcher. In this mini game, an opportunity to take a photograph is given only once.

In the mini game shown in FIG. 6, a depicted sky over a futuristic city represents a task image, and a positive judgment is made in the case of taking a picture of spacecrafts flying in the sky. In this mini game, the number of times a photograph is taken is not limited, and the larger the number of photographed spacecrafts, the higher the score that is given.

In the mini game shown in FIG. 7, numbers arranged in such a manner as to fill the screen represent a task image, and out of these numbers, "7s" are selected and photographed. For example, three shutter chances are given, and when three "7s" displayed in different positions are all photographed, a high score is given.

Furthermore, as shown in FIGS. 5 to 7, an area for displaying photographed images in provided in the lower portion of the game screen of this embodiment (hereinafter, this area is referred to as a "photographing result display area"), and three photographed images can be displayed for each of two players. In the mini game shown in FIG. 5, because one shutter chance is given to each player, only one photographed image is displayed in the photographing result display area of three frames prepared for each player. In the mini game shown in FIG. 6, because the number of shutter chances is not particularly limited, the latest three photographed images are displayed in the above described photographing result display area. In the mini game shown in FIG. 7, three shutter chances are given and the number of shutter chances is identical to the number of frames included in the photographing result display area prepared for each player. Thus, three photographed images are all displayed in the photographing result display area.

Figure 8:
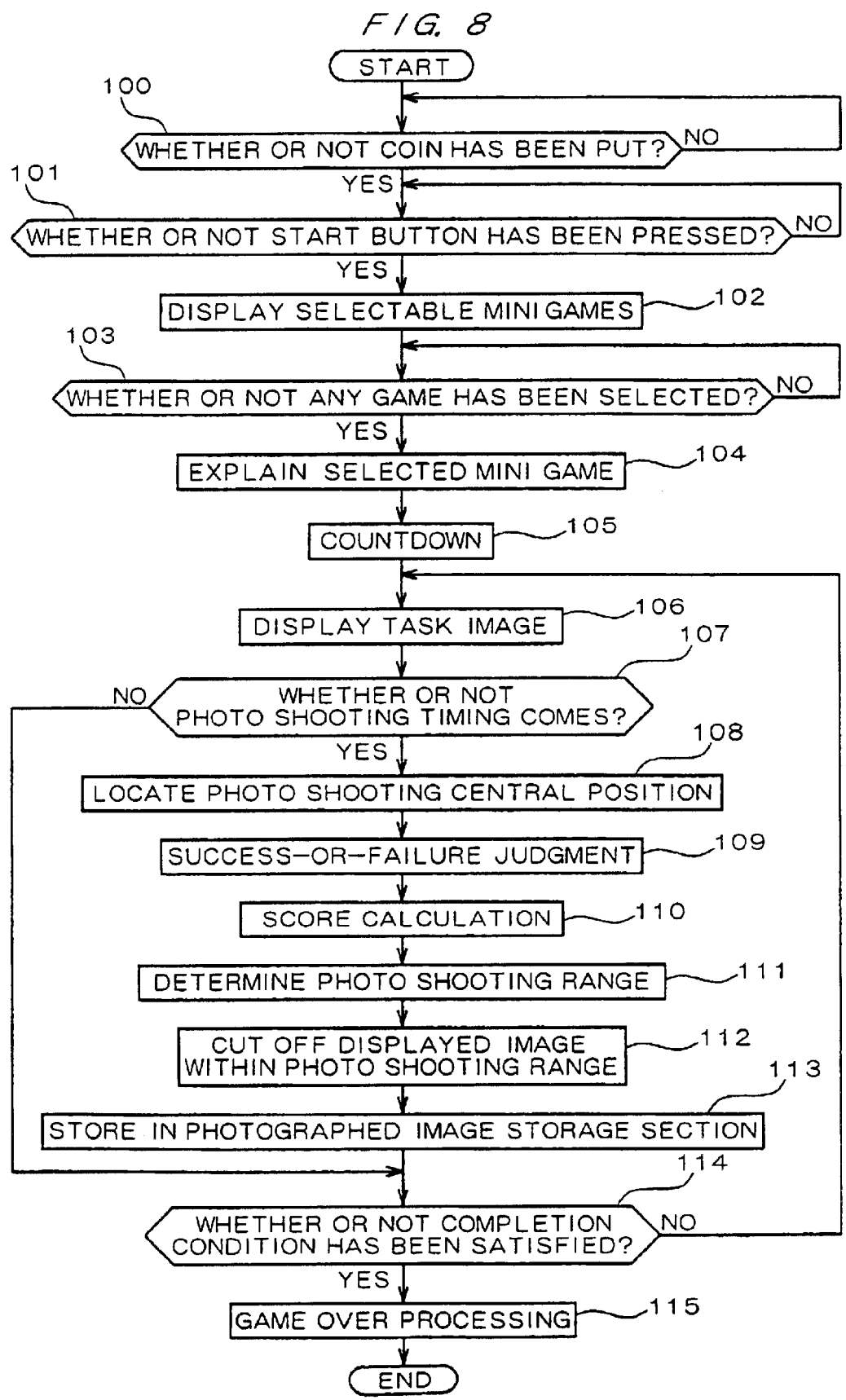
FIG. 8 is a flowchart showing an operation procedure of the photographing game machine of this embodiment.

FIG. 8 is a flowchart showing an operation procedure of the photographing game machine of this embodiment. The game progression processing section 51 in the game operation section 50 makes a judgment of whether or not a coin has been put into the coin slot 40 by the player (Step 100). If it is judged that the coin has been put thereinto, the game progression processing section 51 makes a judgment of whether or not the start button 42 has been pressed down by the player (Step 101). If it is judged that the start button 42 has been pressed down, the game progression processing section 51 then displays a predetermined game selection screen including as options a plurality of selectable mini games that are prepared in advance (Step 102). For example, instructions to generate the game selection screen are sent from the game progression processing section 51 to the image generating section 52, option image data including characteristic scenes of respective mini games and names of respective mini games is generated by the image generating section 52. This option image data is written in two screen memories 62 and 64 in the video output section 60 interchangeably, and a predetermined game selection screen is displayed on the display device 30.

Then, the game progression processing section 51 repeatedly performs processing of making a judgment of whether or not any mini game included in the game selection screen has been selected until any mini game is selected (Step 103). For example, the player uses any one of the camera-type input devices 10, 20 to take a photograph of the option image of any mini game displayed on the screen, whereby the player can select a mini game corresponding to this photographed option image. When any mini game is selected by the player, a positive judgment is made in Step 103, and the game progression processing section 51 then explains the contents of the selected mini game (Step 104).

Then, the game progression processing section 51 performs countdown processing for displaying the task image of the selected mini game (Step 105). Specifically, instructions are sent to the image generating section 52, and a countdown screen including numbers one after another in descending order just like "5", "4", "3", "2", "1" in such a manner that the number fills the whole screen of the display device 30 is generated.

When the countdown processing is ended, the game progression processing section 51 then displays a game screen corresponding to the selected mini game (Step 106). Display of this game screen is performed by writing the image data of the game screen in the current screen memory 62 in the video output section 60 by the image generating section 52. Also, when display of one screen using the current screen memory 62 is ended, the image data stored in this current screen memory 62 is stored in the prior screen memory 64.

Also, the timing judgment section 53 makes a judgment of whether or not photo shooting timing of having the screen flash-displayed comes in (Step 107). If it is judged that timing of having the screen flash-displayed comes in, the timing judgment section 53 sends to the image generating section 52 instructions to have the next screen flash-displayed, and the coordinate of the photo shooting central position is located by the photo shooting central position locating section 54 (Step 108).

Figure 9:
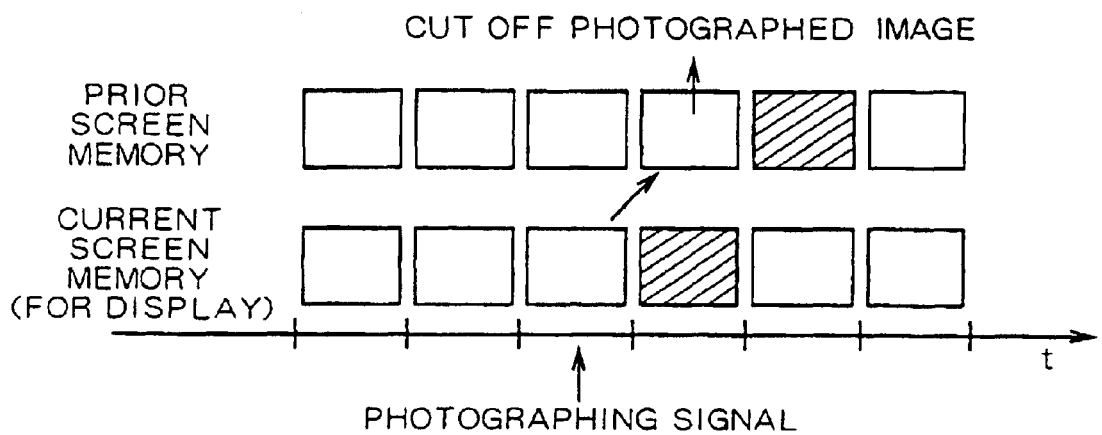
FIG. 9 illustrates photo shooting timing.
Figure 10:
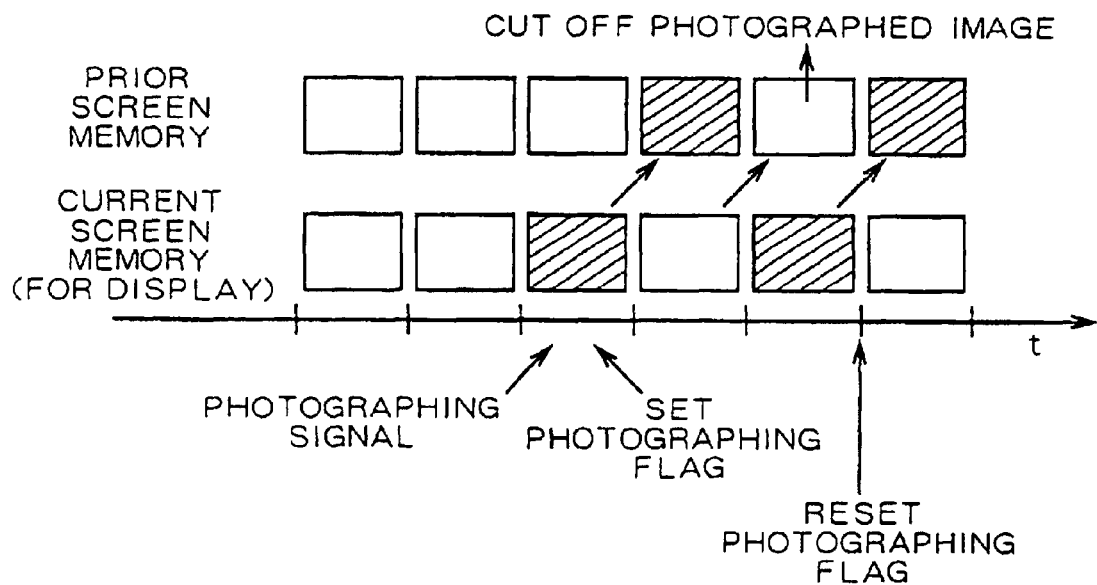
FIG. 10 illustrates photo shooting timing.

FIGS. 9 and 10 illustrate photo shooting timing. These drawings show relations between photographing signals inputted from the camera-type input devices 10, 20 and the contents of the current screen memory 62 and prior screen memory 64 in the video output section 60, and each of rectangle frames show the current screen memory 62 and the prior screen memory 64. The current screen memory 62 or the prior screen memory 64 in which image data for performing flash display is written is provided with hatching.

As shown in FIG. 9, if the photographing signal is inputted from at least one of the camera-type input devices 10, 20, and the display screen at this time is not a flash screen, photo shooting timing of generating a flash screen comes in at this time. In this case, when the screen then goes into an off-display state, image data for flash display is written in the current screen memory 62, and flash display occurs in the next screen.

Also, as shown in FIG. 10, if the photographing signal is inputted from at least one of the camera-type input devices 10, 20, and the display screen at this time is a flash screen, image data for flash display is written in the current screen memory 62 when this screen goes into an off-display state after the next screen is displayed. Thus, the screen that is displayed immediately after the photographing signal is inputted is a normal game screen, and the normal game screen is compulsorily inserted between a flash screen to be displayed subsequently and the previous flash screen.

Then, the photographing judgment section 57 makes success-or-failure judgment to examine whether or not a predetermined subject defined as a target could be photographed (Step 109), and the score calculation section 58 performs score calculation consistent with the result of this success-or-failure judgment (Step 110).

In the case of the mini game shown in FIG. 5, for example, the scene at the moment when the batter strikes back a ball thrown by the pitcher is a target defined as a subject to be photographed, and when agreement is attained in both photo shooting timing and photo shooting position, the photographing judgment section 57 makes a positive judgment and the score calculation section 58 performs processing of adding points for the player for whom the positive judgment is made.

Also, in the case of mini game shown in FIG. 6, spacecrafts flying continuously are targets defined as subjects to be photographed, and when the position in which this spacecraft is displayed is consistent with the photo shooting position, the photographing judgment section 57 makes a positive judgment and the score calculation section 58 performs processing of adding points for the player for whom the positive judgment is made. Also, in this mini game, the player may take a photograph of the spacecraft over and over again within the time limit, and a positive judgment is made and processing of adding points is performed every such occasion.

Also, in the case of the mini game shown in FIG. 7, the image of the number "7" displayed fixedly is a target defined as a subject to be photographed, and when the position in which this number "7" is displayed is consistent with the photo shooting position, the photographing judgment section 57 makes a positive judgment and the score calculation section 58 performs processing of adding points for the player for whom the positive judgment is made. Also, in this mini game, a chance to take a photograph of the number "17" is given three times within the time limit in terms of three "7s" displayed in different positions, and thus positive judgment is made to perform processing of adding points maximum three times.

Then, the photographed image extraction section 55 determines by calculation a photo shooting range based on the photo shooting central position extracted by the photo shooting central position locating section 54 (Step 111), cuts off the displayed image in the photo shooting range (Step 112), and stores the same in the photographed image storage section 56 (Step 113). For example, if the displayed screen is photographed by the camera-type input devices 10, 20, whereby a rectangle area of height a×width b represents a photo shooting range, the photographed image extraction section 55 determines as a photo shooting range an area corresponding to the coordinate (X, Y) satisfying the following conditions, based on the coordinate (X0, Y0) of the located photo shooting central position:

Range in the direction of X axis: $X0-a/2<X<X0+a/2$,
Range in the direction of Y axis; $Y0-b/2<Y<Y0+b/2$.

Also, the image data corresponding to the photo shooting range is cut off using image data stored in the prior screen memory 64 in the video output section 60. Since detection of the photo shooting central position is carried out with the whole screen being flash-displayed, the image data in the photo shooting range cannot be extracted from this flash-displayed screen. Thus, in this embodiment, the image data is cut off from the normal game screen displayed immediately before the flash screen.

Furthermore, as described above, the photographed image storage section 56 has capacity capable of storing therein the image data extracted with three photo shootings for each player, and in the case where more than three photo shootings are permitted (the case where the number of photo shootings is not limited as in the case of the mini game shown in FIG. 6, and so on), only image data corresponding to the latest three photo shootings are stored.

Then, the game progression processing section 51 makes a judgment of whether or not predetermined completion conditions have been satisfied (Step 114). For example, in the case where a time limit is imposed, a judgment is made as to whether or not time has elapsed over this time limit since the game was started. Also, in the case where a time limit is defined and the number of photo shootings is defined, a judgment is made as to whether or not time has been elapsed over this time limit since the game was started or the number of actual photo shootings has reached this predetermined number of photo shootings. If the predetermined completion conditions are not satisfied, a negative judgment is made in the judgment in Step 114, and a return to the above described Step 106 is made to continue processing subsequent to the display of the task image by switching the display screen.

Also, if predetermined completion conditions are satisfied, a positive judgment is made in Step 114, and then the game progression processing section 51 performs predetermined game over processing (Step 115). For example, instructions are sent from the game progression processing section 51 to the image generating section 52, and a predetermined ending screen including a score for each player is displayed. In this way, game operations with respect to a series of mini games selected by the player are ended.

By the way, in this embodiment, a contrivance is made to prevent the image for flash display from being cut off, by using the photographing flag 59.

Figure 11:
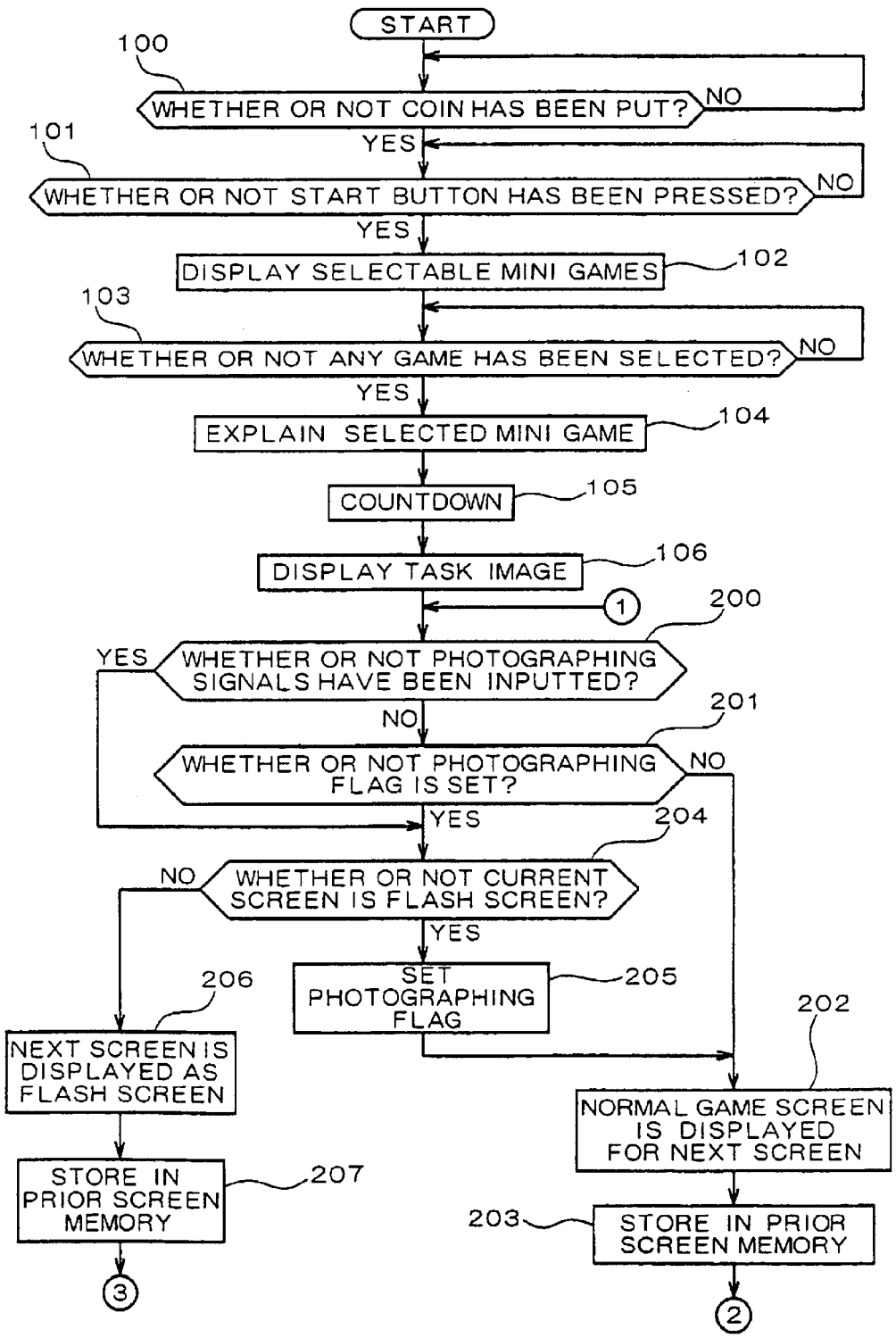
FIG. 11 is a flowchart showing another operation procedure of the photographing game machine of this embodiment.
Figure 12:
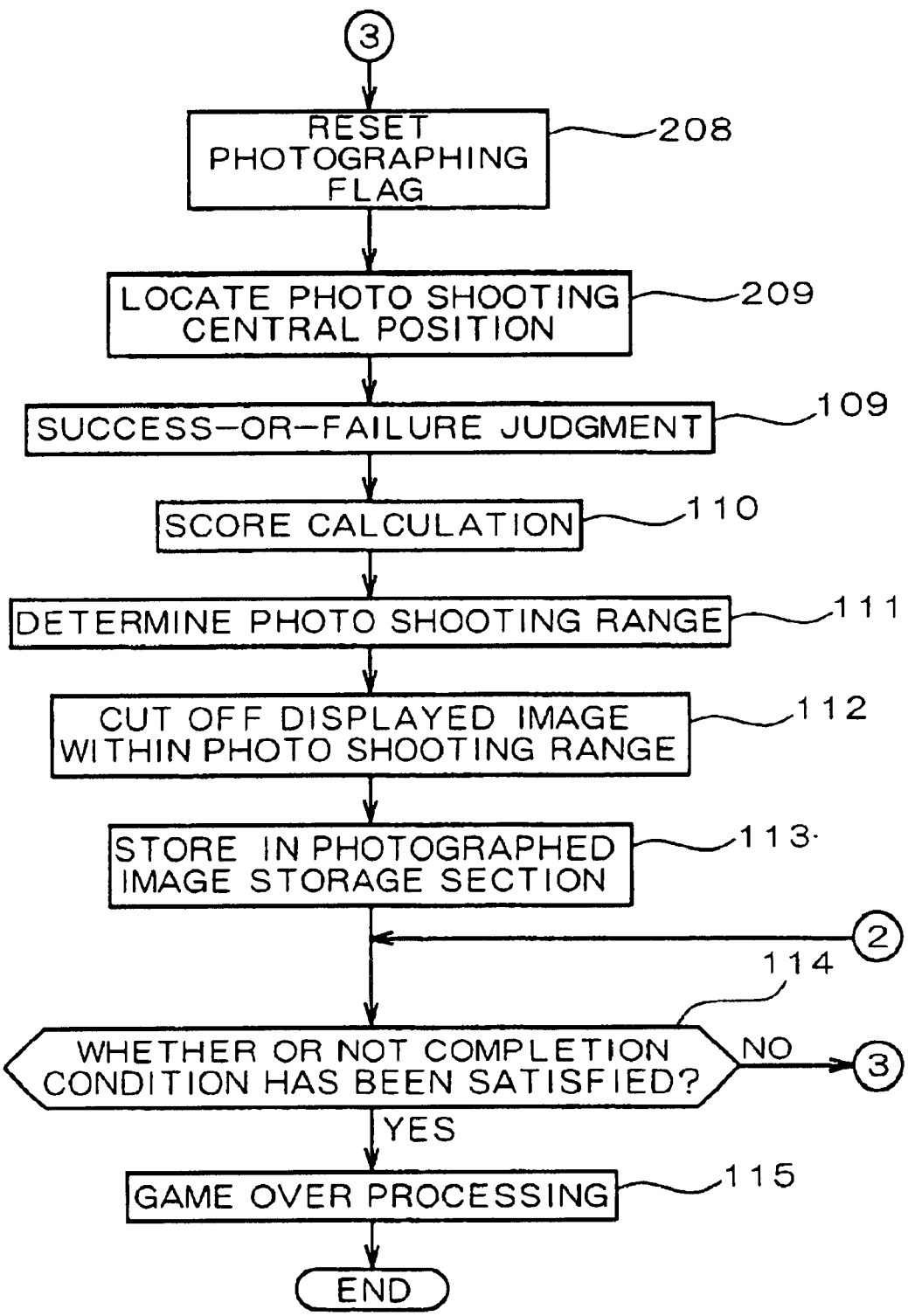
FIG. 12 is a flowchart showing another operation procedure of the photographing game machine of this embodiment.

FIGS. 11 and 12 are flow charts showing operation procedures of the photographing game machine focusing on the photographing flag 59. Furthermore, operations identical to operation procedures shown in FIG. 8 are given step numbers identical to those of their counterparts in FIG. 8. Specifically, operations of Steps 100 to 106 and Steps 109 to 115 shown in FIG. 8 are shared, and operations of Steps 107 to 109 shown in FIG. 8 are replaced by operations of Steps 200 to 209 shown FIGS. 11 and 12. Operations of the photographing game machine will be described below, laying stress on these replacing operations of Steps 200 to 209.

When countdown processing is ended, the game progression processing section 51 then starts displaying the task image corresponding to the selected mini game (Step 106).

Also, the timing judgment section 53 makes a judgment of whether or not photographing signals have been inputted from the camera-type input devices 10, 20 (Step 200). If the photographing signals have not been inputted yet, a negative judgment is made, and the timing judgment section 53 then makes a judgment of whether or not the photographing flag 59 is set (Step 201).

This photographing flag 59 is used to delay timing of having the screen flash-displayed by one screen. In other words, the case where this photographing flag 59 is set means a case where this photographing flag 59 is set instead of having a next screen flash-displayed in the case where the flash screen is already displayed at the time when the photographing signal is inputted, and if the screen to be displayed subsequently is flash-displayed according to this photographing signal, both of the two consecutive screens would become flash screens. Generally, there are no cases where both of the two consecutive screens become flash screens if one player presses down the shutter switch 14 of the camera-type input device 10 at a short time interval, but there may be cases where only the time interval at which the screen is displayed is shifted (for example, shifted by sixtieth of a second) to output the photographing signal if two players press down the respective shutter switches of the camera-type input devices 10, 20 almost at the same time. In such a case, the photographing flag 59 is set at the time when the second photographing signal is inputted. When this photographing flag 59 is simply set, image data for normal game screens is written in the current screen memory 62, and thus the screen to be displayed subsequently will be not a flash screen but a normal game screen. Also, when this normal game screen is displayed, it is detected in the above described judgment in Step 201 that the photographing flag 59 is set, and a next display screen is flash-displayed.

If the photographing flag 59 is not set, a negative judgment is made in Step 201, and the game progression processing section 51 then sends to the image generating section 52 instructions to generate image data of the normal game screen. In response to the instructions, the image generating section 52 generates image data of the game screen to be displayed in the next screen, writes this generated image data in the current screen memory 62 in the video output section 60 at the time when the screen is in an off-display state. Thereby, when the display screen is switched subsequently, the normal game screen is displayed from the display device 30 (Step 202). When display of screens using the current screen memory 62 is ended, the video output section 60 stores in the prior screen memory 64 the image data stored in the current screen memory 62 (Step 203).

Also, when the shutter switch 14 of the camera-type input device 10 or the shutter switch 24 of the camera-type input device 20 is pressed down by the player to input the photographing signal, a positive judgment is made in the above described judgment in Step 200, and the timing judgment section 53 then makes a judgment of whether or not the current display screen is a flash screen (Step 204). If the current display screen is a flash screen, a positive judgment is made, and the timing judgment section 53 then sets the photographing flag 59 (Step 205). Thereafter, a movement to processing in Step 109 is made, and processing is carried out so that the next display screen is displayed as a normal game screen.

Also, if the display screen is not a flash screen at the time when the photographing signal is inputted, a negative judgment is made in the above described judgment in Step 204, and the timing judgment section 53 sends to the image generating section 52 instructions to have the next display screen flash-displayed. In response to the instructions, the image generating section 52 generates image data for flash display that is to be displayed in the next screen, and writes this generated image data in the current screen memory 62 in the video output section 60 in at the time when the screen in an off-display state. Thereby, when the display screen is switched subsequently, the flash screen is displayed on the display device 30 (Step 206). When display of screens using the current screen memory 62 is ended, the video output section 60 stores in the prior screen memory 64 the image data stored in the current screen memory 62 (Step 207). In this way, when the next screen is flash-displayed, the timing judgment section 53 resets the photographing flag 59 (Step 208).

As shown in FIG. 10, if the photo graphing signal is inputted from at least one of the camera-type input devices 10, 20, and the screen display at this time is a flash screen, the photographing flag 59 is set and a normal game screen is displayed for the next screen. Also, when this screen goes into an off-display state after this normal game screen is displayed, the image data for flash display is written in the current screen memory 62, based on the set photographing flag 59. In this way, the flash screen is displayed in timing such that it is displayed immediately after the normal game screen is displayed, and thereafter, the photographing flag 59 is reset. In this way, in the case where the flash screen is displayed at the time when the photographing signal is inputted, the normal game screen is displayed subsequently, and then the flash screen is displayed subsequently. Thus, the normal game screen is compulsorily inserted between the next flash screen and the last flash screen, and image data corresponding to the normal game screen can be cut off from the prior screen memory 64 when the flash screen is displayed.

Then, the photo shooting central position locating section 54 locates a photo shooting central position in parallel with the above described operations to display the flash screen (Step 209). Then, the photographing judgment section 57 makes a success-or-failure judgment to examine whether or not a predetermined subject defined as a target could be photographed (Step 117).

In this way, in the photographing game machine of this embodiment, the game progresses through detection of the photo shooting position on the game screen when the game screen is photographed in a virtual manner using the camera-type input devices 10, 20, thus making it possible to relieve a processing load significantly compared to the case where a judgment is made as to the contents of an actually photographed image. Also, the light receiving sections 12, 22 are used instead of image pickup elements such as CCD in the camera-type input devices 10, 20, thus making it possible to reduce parts costs.

Also, since a part of the image generated for displaying the game screen is extracted as a photographed image, there is no degradation in image quality compared to photographed images obtained by actual photographing, thus making it possible to improve in image quality when this photographed image is displayed. Also, since a part of the image generated for displaying the game screen is used, it is not necessary to perform complicated processing to extract a photographed image. Furthermore, in this embodiment, the photographed image is displayed in a part of game screen, but the photographed image may be printed using a printer, and in this case image quality can also be improved.

Also, an optional position on the game screen is detected as a photo shooting position when the shutter switch provided for the camera-type input device 10 or the like is operated, thus making it possible to ensure operability as in the case of a real camera.

Also, it is possible to make the whole display screen emit light using the scan type display device 30 and detect this optional position based on the timing of emitting light from this position, and this detection principle is introduced in the photographing game machine using camera-type input devices, whereby the photo shooting position can be known easily and accurately.

Also, in the photographing game machine of this embodiment, when images photographed using the camera-type input devices 10, 20 are cut off, the screen made to emit light for detection of the photo shooting central position is not used, but the game screen as a non-light-emission screen immediately previously displayed is used, thus making it possible to cut off the photographed image reliably.

Also, if two consecutive screens become flash-displayed objects, control to delay by one screen the timing of having flash-displayed the screen that becomes a flash-displayed object later is carried out, and the normal game screen is always inserted between the two flash screens. Thus, the photographed image can reliably be cut off from the game screen.

Furthermore, the present invention should not be limited to the above described embodiment, and many variations are possible without departing the spirit of the present invention. In the embodiment described above, the display device 30 of the raster scan type constituted by the CRT or the like is combined with the camera-type input device 10 having the light receiving section 12 and so on to detect the photo shooting central position on the display screen, but the mechanism to detect the photo shooting central position should not be limited thereto. For example, in the case where the camera-type input device is provided with a location sensor, an angle sensor or the like to enable direct detection of the photo shooting central position, the display device 30 can be achieved using a liquid crystal display device, a liquid crystal projector or the like that do not perform raster scanning. Also, the photo shooting central position may be located by providing the camera-type input device with an infrared light emitting section or the like to photograph an irradiated point on the screen by photographing unit such as a CCD camera, and analyzing the photographed image.

Figure 13:
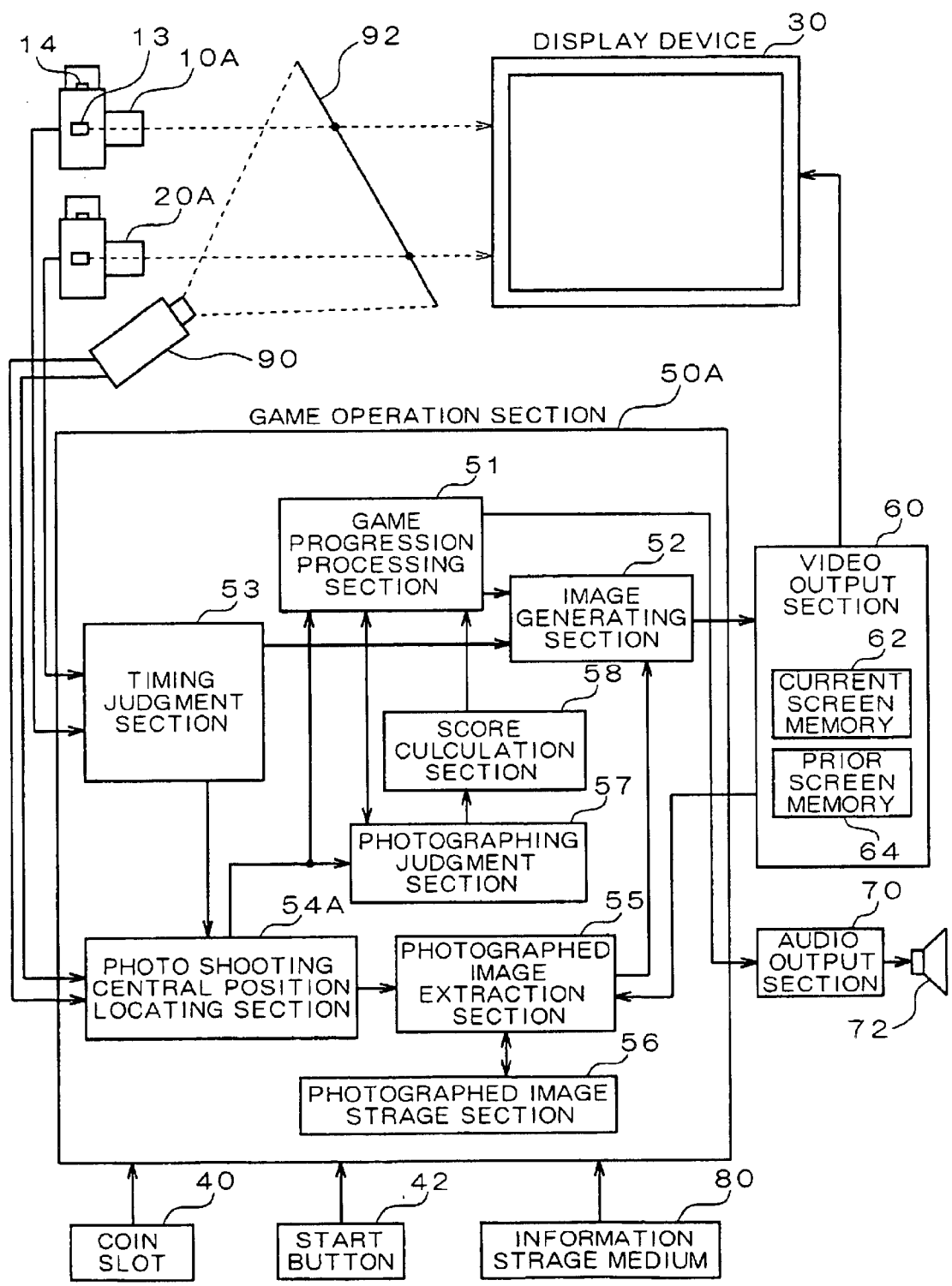
FIG. 13 shows a configuration of the photographing game machine using the camera-type input device providing a light emitting section.

FIG. 13 shows a configuration of a photographing game machine using a camera-type input device comprising a light receiving section. In the photographing game machine shown in FIG. 13, the mechanism to detect the photo shooting central position is changed, as a point of difference compared to the photographing game machine shown in FIG. 1. Explanation will be given below, focusing on this point of difference.

A camera-type input device 10A has the light emitting section 13 and the shutter switch 14. Furthermore, a camera-type input device 20A has a similar configuration. The light emitting section 13 emits light including infrared wavelength components, and is constituted by a semiconductor laser, for example. A laser beam emitted from this light emitting section 13 is passed through the lens system of the camera-type input device 10A, thereby being launched towards the display screen of the display device 30 as an almost converged ray.

A camera 90 is used for taking a photograph of a screen 92. This screen 92, which is constituted by a translucent member, is placed ahead of the display device 30 in such a manner as to obstruct the sight of the player looking at the screen of the display device 30. The player can see the game image displayed on the screen of the display device 30 through this screen 92. When the laser beam is launched from the camera-type input devices 10A and 20A towards an optional position on the screen of the display device 30, an image is formed by the laser beam in a position on the screen 92 corresponding to the optional position of this screen. The camera 90 takes a photograph of the whole screen 92 including this formed image to generate image data.

A photo shooting central position locating section 54A in a game operation section 50A analyzes the image of the screen 92 photographed by the camera 90, thereby locating the photo shooting central position on the display screen photographed by the camera-type input devices 10A, 20A. This photo shooting central position locating section 54A corresponds to position detecting unit.

In this way, in the case where the light emitting section provided for the camera-type input device is made to emit light to specify the photo shooting central position, it is not necessary to have the screen of the display device 30 flash-displayed, and the photo shooting central position can be located irrespective of timing of switching the display screen (timing of scanning)

Also, in the above described embodiment, the photographing game machine for business purpose has been described, but the camera-type input device may be connected to a household game machine to achieve a similar mechanism.

Also, in the above described embodiment, the camera-type input device of single lens reflex structure is used, but a camera-type input device of finder structure may be used. In this case, it is not necessary to use a lens system same as or similar to that of a real camera.

Also, in the above described embodiment, the coordinate detection section 16 is provided in the camera-type input device 10, and the photo shooting central position locating section 54 is provided for the game operation section 50, but these functions may be integrated into one. For example, the function of the coordinate detection section 16 in the camera-type input device 10 may be given to the photo shooting central position locating section 54 in the game operation section 50 to input the output signal of the light receiving section 12 directly in the photo shooting central position locating section 54.

Also, in the above described embodiment, the photographed image is cut off from the game screen displayed immediately before the flash screen, but the photographed image may be cut off from the game screen displayed immediately after the flash screen. In this case, when image data corresponding to the normal game screen displayed immediately after the flash screen is stored in the current screen memory 62 in the video output section 60, the photographed image extraction section 55 may extract from this image data the image data included in the photo shooting range. Alternatively, it may further wait for the next display timing to extract from the prior screen memory 64 the image data included in the photo shooting range.

What is claimed is:

1. A photographing game machine, comprising:
   a simulated camera input device being free to move in all directions allowing a subject included in a photo shooting range to be seen through a window, said window being part of said input device wherein said input device is provided with a shutter switch through which a player provides instructions to take a photograph;
   a photo shooting position detection mechanism detecting as a photo shooting position a selected position on said game screen, at which said simulated camera input device is pointed;
   a display device displaying a predetermined game screen including a targeted portion of said game screen to be photographed; and
   a game operation section performing predetermined game operations based on said photo shooting position detected by said photo shooting position detection mechanism, and
   wherein said game operation section comprising;
   an image generating unit for generating image data of said game screen to be displayed on said display device;
   a photographed image extraction unit for cutting off as an imitational photographed image an imitational photographed portion of said game screen included in a predetermined range centering around said photo shooting position detected by said photo shooting position detection mechanism, wherein said imitational photographed portion is less than the entire displayed screen; and
   a photographing judgment unit for making a judgment concerning whether the player has accomplished a predetermined photographic task, by comparing the display position of said targeted portion of said game screen with said photo shooting position.

2. The photographing game machine according to claim 1, wherein said display device comprises a scan display screen, and
   said photo shooting position detection mechanism comprises:
   a light receiving unit that is placed in said simulated camera input device and detects directive incident light;
   a screen lighting unit for making the screen of said display device emit light when said shutter switch is operated; and
   a position detecting unit for detecting said photo shooting position based on timing of detecting light by said light receiving unit placed in said simulated camera input device, when the screen of said display device is made to emit light by said screen lighting unit.

3. The photographing game machine according to claim 2, wherein said photographed image extracting unit cuts off image data included in a predetermined photo shooting range including said photo shooting position out of image data corresponding to a non-light-emission screen displayed in timing before or after timing of emitting light, when the display screen of said display device is made to emit light to perform detection of said photo shooting position.

4. The photographing game machine according to claim 2, wherein said screen lighting unit delays timing of emitting light by at least one screen, and inserts said game screen between any two consecutive screens that might be made to emit light by said screen lighting unit to prevent merging thereof into a single continuous screen emitting light.

5. The photographing game machine according to claim 4, comprising a plurality of said simulated camera input devices.

6. The photographing game machine according to claim 1, wherein said photo shooting position detection mechanism comprises:
   a light emitting section that is placed in said simulated camera input device and launches predetermined directive light towards the screen of said display device;
   a screen constituted by a translucent member that is placed between said simulated camera input device and the screen of said display device;
   a photographing unit for taking a photograph of said screen; and a position detecting unit for detecting said photo shooting position, by detecting a position on said screen that is reached by the light launched from said light emitting section towards the screen of said display device, based on the result of photographing by said photographing unit.

7. The photographing game machine according to claim 6, wherein said light emitting section is an infrared light emitter.

8. The photographing game machine according to claim 1, wherein said input device is operated by the player, by maintaining almost constant distance from the display screen of said display device, and said photographed image extracting unit defines as said photo shooting range a definite area centering around said photo shooting position.

9. A photographing game machine according to claim 1 wherein said photographed image extraction unit determines said imitational photographed portion by satisfying the following conditions, based on a coordinate (X0, Y0) of said photo shooting position:

Range in the direction of X axis: X0−a/2<X<X0+a/2,
Range in the direction of Y axis; Y0−b/2<Y<Y0+b/2.

10. A photographing game machine, comprising:

a simulated camera input device being free to move in all directions allowing a subject included in a photo shooting range to be seen through a window, said window being part of said input device wherein said input device is provided with a shutter switch through which a player provides instructions to take a photograph;

a display device displaying a predetermined game screen including a target to be photographed;

a photo shooting position detection mechanism detecting as a photo shooting position a selected position on said screen, at which said simulated camera input device is pointed, by making the display screen of said display device emit light; and a game operation section performing predetermined game operations based on said photo shooting position detected by said photo shooting position detection mechanism, and wherein said game operation section comprising;

an image generating unit for generating image data of said game screen to be displayed on said display device;

a photographed image extracting unit for cutting off as an imitational photographed image an image on said game screen included in a predetermined range centering around said photo shooting position out of image data corresponding to a non-light-emission screen displayed in timing before or after timing of emitting light, when the display screen of said display device is made to emit light to perform detection of said photo shooting position, wherein said cut off image is less than the entire displayed screen.

11. A photographing game processing method, comprising:

a first step of detecting a selected photo shooting position on a game screen, at which a simulated camera input device, being movable in all directions, is pointed, by making a display screen of a display device emit light;

a second step of making a judgment of relative positional relation between the photo shooting position on said game screen detected in said first step and a display position of a targeted portion included in said game screen;

a third step of making a judgment of whether or not a predetermined photographic task given to a player can be achieved, based on the result of the judgment in said second step; and a fourth step of cutting off as an imitational photographed image an image on said game screen included in a predetermined range centering around said photo shooting position out of image data corresponding to a non-light-emission screen displayed in timing before or after timing of emitting light, wherein said cut off image is less than the entire displayed screen, when said photo shooting position is detected in said first step.

12. An information storage medium comprising a program for causing a computer to perform, wherein said program comprising:

a first step of detecting a selected photo shooting position on a game screen of a display device at which a simulated camera input device, movable in all directions, is pointed;

a second step of making a judgment of relative positional relation between the photo shooting position on said game screen detected in said first step and a display position of a targeted portion included in said game screen;

a third step of making a judgment of whether or not a predetermined photographic task given to a player can be achieved, based on the result of the judgment in said second step; and a fourth step of cutting off as an imitational photographed image an image on said game screen-included in a predetermined range centering around said photo shooting position out of image data corresponding to a non-light-emission screen displayed in timing before or after timing of emitting light, wherein said cut off image is less than the entire displayed screen, when said photo shooting position is detected in said first step.

13. An information storage medium according to claim 12, wherein said display device comprising a scan display screen, and said first step comprises detecting a selected position on said game screen based on timing of detecting light by said light receiving unit placed in said simulated camera input device, when the screen of said display device is made to emit light.

* * * * *